United States Patent
Ramakrishnan et al.

(10) Patent No.: US 7,848,432 B2
(45) Date of Patent: Dec. 7, 2010

(54) SYSTEM AND METHOD FOR EFFICIENTLY STORING MACROBLOCKS IN SD-RAM

(75) Inventors: Lakshman Ramakrishnan, Bangalore (IN); Sathish Kumar Radhakrishnan, Bangalore (IN); Brian Schoner, Fremont, CA (US); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1304 days.

(21) Appl. No.: 10/716,008

(22) Filed: Nov. 18, 2003

(65) Prior Publication Data

US 2005/0002460 A1    Jan. 6, 2005

Related U.S. Application Data

(60) Provisional application No. 60/484,512, filed on Jul. 2, 2003.

(51) Int. Cl.
*H04N 7/12* (2006.01)
*H04N 7/18* (2006.01)

(52) U.S. Cl. ................... 375/240.25; 348/384

(58) Field of Classification Search ............... 348/384, 348/402, 405, 415, 416, 419, 420, 699, 700, 348/714, 715, 718, 396, 395, 397; 375/240.01, 375/240.12, 240.25, 240.15, 240.24, 240.16; 382/232, 233, 234, 235, 236, 237, 238, 239, 382/302

See application file for complete search history.

(56) References Cited

U.S. PATENT DOCUMENTS

| | | | | |
|---|---|---|---|---|
| 4,575,814 A * | 3/1986 | Brooks et al. | ............... | 711/217 |
| 5,461,486 A * | 10/1995 | Uchida | .................. | 386/81 |
| 5,778,412 A * | 7/1998 | Gafken | .................. | 711/5 |
| 5,920,352 A * | 7/1999 | Inoue | ................ | 348/384.1 |
| 6,215,822 B1 * | 4/2001 | Bose et al. | ............ | 375/240.16 |
| 6,614,442 B1 * | 9/2003 | Ouyang et al. | ............ | 345/545 |
| 6,898,246 B2 * | 5/2005 | Katayama | ............ | 375/240.25 |
| 7,068,847 B1 * | 6/2006 | Chen | .................. | 382/233 |
| 7,079,583 B2 * | 7/2006 | Yoshioka et al. | ....... | 375/240.26 |
| 2003/0123555 A1* | 7/2003 | Kim | ............... | 375/240.25 |

* cited by examiner

*Primary Examiner*—Behrooz Senfi
(74) *Attorney, Agent, or Firm*—McAndrews, Held & Malloy, Ltd.

(57) ABSTRACT

Presented herein are systems and methods for efficiently storing macroblocks in DRAM. The macroblocks are stored contiguously allowing each macroblock to be written and overwritten in a single write transaction. Additionally, in one embodiment, as many as five macroblocks can be written or overwritten in a single write transaction.

7 Claims, 4 Drawing Sheets

SYSTEM AND METHOD FOR EFFICIENTLY STORING MACROBLOCKS IN SD-RAM

RELATED APPLICATIONS

This application claims priority to U.S. Provisional Application for Patent, Ser. No. 60/484,512, entitled "SYSTEM AND METHOD FOR EFFICIENTLY STORING MACROBLOCKS IN SD-RAM", filed Jul. 2, 2003, by Kumar, et. al.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The MPEG-2 standard for encoding and compressing video data uses macroblocks for encoding individual frames from the video data. Each frame is associated with three matrices representing luminance and two chrominance (Cb and Cr) values. The Y matrix has an even number of rows and columns while the Cb and Cr matrices are one-half the size of the Y matrix in each direction (horizontal and vertical) Each matrix is further divided into 8×8 segments known as blocks. Each block from the chrominance matrices is associated with four blocks from the luminance matrix because the luminance matrix is twice the size of the chrominance matrices in both directions. The blocks from the chrominance matrices and the associated four blocks from the luminance matrix together form a macroblock.

Each macroblock is compressed using a variety of algorithms taking advantage of both spatial and temporal redundancies. The macroblocks forming the frames of the video sequence are then packetized and multiplexed for transmission to a decoder that decodes the video sequence.

During the decoding of the video sequence, the frames of the video sequence are decoded and stored in frame buffers. The frame buffers store frames prior to display on a display device. Additionally, frame buffers also store reference frames that are used for decoding frames that are predicted therefrom.

The frames are decoded in units of macroblocks. After decoding a macroblock, the decoder writes the decoded macroblock into a frame buffer. As noted above, the macroblock includes a 16×16 luminance matrix, and two 8×8 chrominance matrices. In order to decode and display frames in real-time, it is advantageous if a simple addressing scheme is used. A particularly simple addressing scheme is based on integer powers of two. Each of the foregoing matrices have an integer power of two bytes ($2^8$ for the luminance matrix and $2^6$ for the chrominance matrix). Accordingly, in a memory storing luminance matrices, the address of the xth luminance matrix is determined by offsetting the starting address with $x*2^8$. In a memory storing chrominance matrices, the address of the xth chrominance matrix is determined by offsetting the starting address with $x*2^6$.

Although the luminance and chrominance matrices have an integer power of two bytes, a macroblock comprises 384 bytes. To simplify the addressing scheme for macroblocks, the luminance, and two chrominance matrices are stored in separate, non-contiguous, frame buffer portions.

The foregoing simplifies the addressing scheme for the luminance and two chrominance matrices. However, during the writing of a macroblock, each matrix is written separately because the portions of the frame buffer written to are non-contiguous. As a result, a separate write transaction is required for writing each matrix. The foregoing requires more instructions and operations for writing a macroblocks.

Further limitations and disadvantages of conventional and traditional approaches will become apparent to one of skill in the art, through comparison of such systems with the present invention as set forth in the remainder of the present application with reference to the drawings.

SUMMARY OF THE INVENTION

A system, method, and apparatus for efficiently storing macroblocks in SD-RAM are presented herein.

In one embodiment, there is presented a method for storing macroblocks in a memory. The macroblocks are stored in memory by decoding a macroblock, and executing an instruction. The instruction causes the macroblock to be written in memory.

In another embodiment, there is presented a method for storing macroblocks in a memory. The macroblocks are stored in memory by decoding five macroblocks and executing an instruction. The instruction causes writing the five macroblocks to the memory.

In another embodiment, there is presented a circuit for storing macroblocks. The circuit comprises a decoder and a computer readable medium. The decoder decodes the macroblocks. The computer readable medium stores an executable instruction. The executable instruction causes writing of the macroblock to the memory.

In another embodiment, there is presented a circuit for storing macroblocks comprising a decoder and a computer readable medium. The decoder decodes five macroblocks. The computer readable medium stores an executable instruction. The instruction causes writing of the five macroblocks to the memory.

These and other advantages and novel features of the present invention, as well as details illustrated embodiments thereof, will be more fully understood from the following description and drawings.

DETAILED DESCRIPTION OF THE INVENTION

Figure 1:
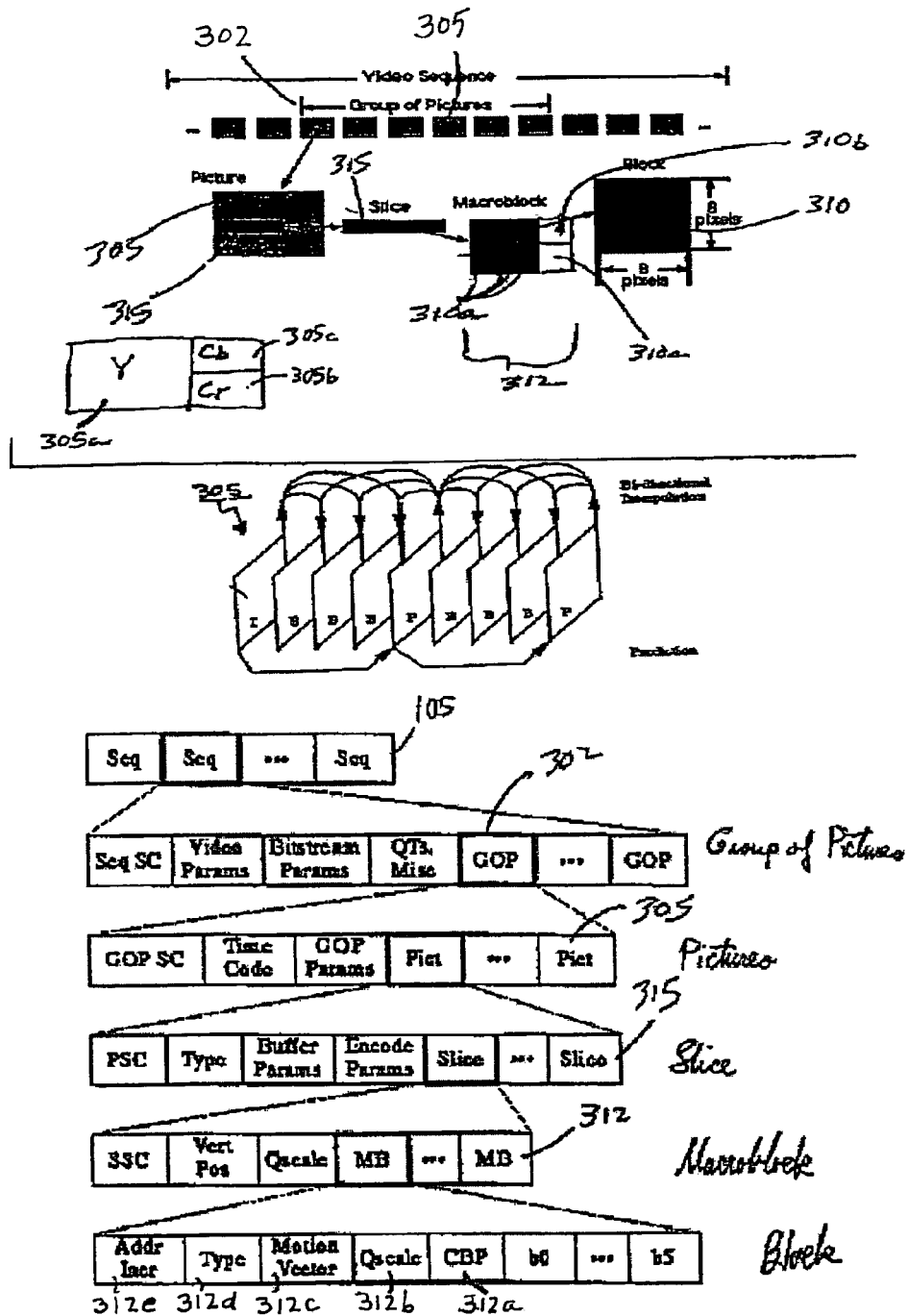
FIG. 1 is a block diagram describing the encoding of video data in accordance with the MPEG-2 specification

Referring now to FIG. 1 there is illustrated a block diagram of the MPEG-2 video stream hierarchy. A video sequence 105 includes a number of groups 302, wherein each group 302 comprises an encoded representation of a series of pictures 305.

Each picture 305 is associated with three matrices representing luminance (Y) 305a and two chrominance (Cb and Cr) values, 305b, 305c. The Y matrix 305a has an even number of rows and columns while the Cb and Cr matrices 305b, 305c are one-half the size of the Y matrix in each direction (horizontal and vertical). Each matrix 305a, 305b, 305c is further divided into 8×8 segments known as blocks 310. Each block 310b, 310c from the chrominance matrices 305b, 305c is associated with four blocks 310a from the luminance matrix 305a because the luminance matrix 305a is twice the size of the chrominance matrices in both directions. The blocks 310b, 310c from the chrominance matrices 305b, 305c and the associated four blocks 310a from the luminance matrix 305a together form a macroblock 312.

MPEG-2 uses one of the two picture structures for encoding a video sequence. In the frame structure, all the lines of the video are coded. In the field structure, the two fields of a frame are coded independently of each other, and the top fields and bottom fields are coded in an alternating order. Each of the two fields has its own picture header.

A picture 305 is divided into slices 315, wherein each slice 315 includes any number of encoded contiguous macroblocks 310 from left to right and top to bottom order. Slices 315 are used in the handling of errors. If a bit stream contains an error, a slice 315 can be skipped allowing better error concealment.

As noted above, the macroblocks 312 comprise blocks 310 from the chrominance matrices 305b, 305c and the luminance matrix 305a. The blocks 310 are the most basic units of MPEG-2 encoding. Each block 310 from the chrominance matrices 305b, 305c and the associated four blocks from the luminance matrix 305a are encoded, b0 . . . b5, and together form the data portion of a macroblock 312. The macroblock 312 also includes a number of control parameters including (Coded Block Pattern) CBP 312a, Qscale 312b, motion vector 312c, type 312d, and address increment 312e. The CBP 312a indicates the number of coded blocks in a macroblock. The Qscale 312b indicates the quantization scale. The motion vector 312c is used for temporal encoding. The type 312d indicates the method of coding and content of the macroblock according to the MPEG-2 specification. The address increment 312e indicates the difference between the current macroblock address and the previous macroblock address.

The macroblocks 312 are encoded using various algorithms. The algorithms take advantage of both spatial redundancy and/or temporal redundancy. The algorithms taking advantage of spatial redundancy utilize discrete cosine transformation (DCT), quantization, and run-length encoding to reduce the amount of data required to code each macroblock 312. Pictures 305 with macroblocks 312 which are coded using only spatial redundancy are known as Intra Pictures 305I (or I-pictures).

The algorithms taking advantage of temporal redundancy use motion compensation based prediction. With pictures which are closely related, it is possible to accurately represent or "predict" the data of one picture based on the data of a reference picture, provided the translation is estimated. Pictures 305 can be considered as snapshots in time of moving objects. Therefore, a portion of one picture 305 can be associated with a different portion of another picture 305.

Pursuant to the MPEG-2 Standard, a macroblock 315 of one picture is predicted by searching macroblocks 315 of reference picture(s) 305. The difference between the macroblocks 315 is the prediction error. The prediction error can be encoded in the DCT domain using a small number of bits for representation. Two-dimensional motion vector(s) represents the vertical and horizontal displacement between the current macroblock 315 and the macroblock(s) 315 of the reference picture(s). Accordingly, the macroblock 315 can be encoded by using the prediction error in the DCT domain at b0 . . . b5, and the motion vector(s) at 315c describing the displacement of the macroblock(s) of the reference picture(s) 305.

Pictures 305 with macroblocks 315 coded using temporal redundancy with respect to earlier pictures 305 of the video sequence are known as predicted pictures 305P (or P-pictures). Pictures 305 with macroblocks 315 coded using temporal redundancy with respect to earlier and later pictures 305 of the video sequence are known as bi-directional pictures 305B (or B-pictures).

Figure 2:
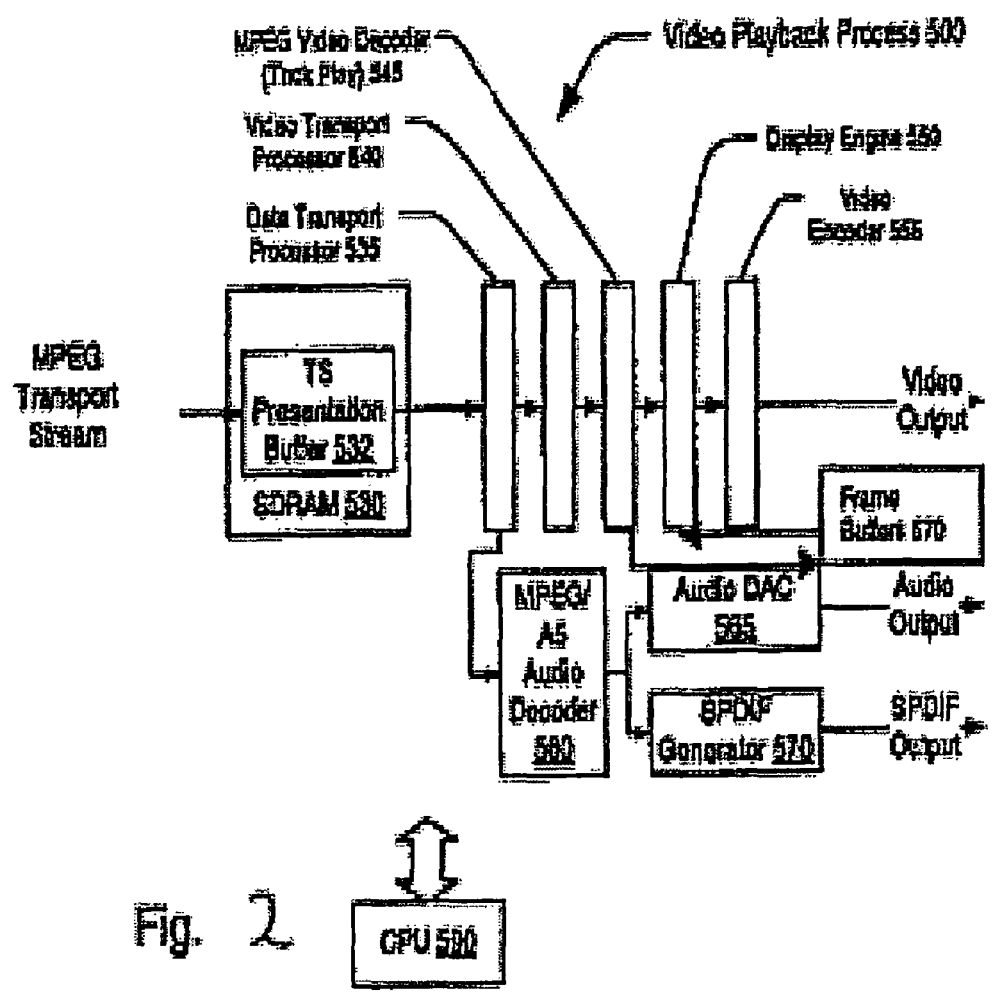
FIG. 2 is a block diagram of an exemplary decoder in accordance with an embodiment of the present invention.

Referring now to FIG. 2, there is illustrated a block diagram of an exemplary decoder in accordance with an embodiment of the present invention. Data is output from buffer 532 within SDRAM 530. The data output from the presentation buffer 532 is then passed to a data transport processor 535. The data transport processor 535 demultiplexes the transport stream into packetized elementary stream constituents, and passes the audio transport stream to an audio decoder 560 and the video transport stream to a video transport decoder 540 and then to a MPEG video decoder 545. The audio data is then sent to the output blocks, and the video is sent to a display engine 550. The display engine 550 scales the video picture, renders the graphics, and constructs the complete display. Once the display is ready to be presented, it is passed to a video encoder 555 where it is converted to analog video using an internal digital to analog converter (DAC). The digital audio is converted to analog in an audio digital to analog converter (DAC) 565.

The decoder also includes a frame buffers 570 for storing frames 305 decoded by the video decoder 545. The frames 305 are stored on a macroblock 312 by macroblock 312 basis into the frame buffers 570.

The frames 305 are stored in the frame buffers 570 to await display by the display engine 250. Additionally, reference frames 305 are stored in the frame buffer 570 for use in prediction of other frames 305. During both the display and the prediction of another frame 305, the pixels in the frame 105 at specific locations within the frame 305 are retrieved. In order to display a frame 305 or predict another frame 305 from a frame 305 in real-time, it is advantageous if the address storing particular pixels can be determined from the location within the frame 305 with simple arithmetic operations.

Figure 3:
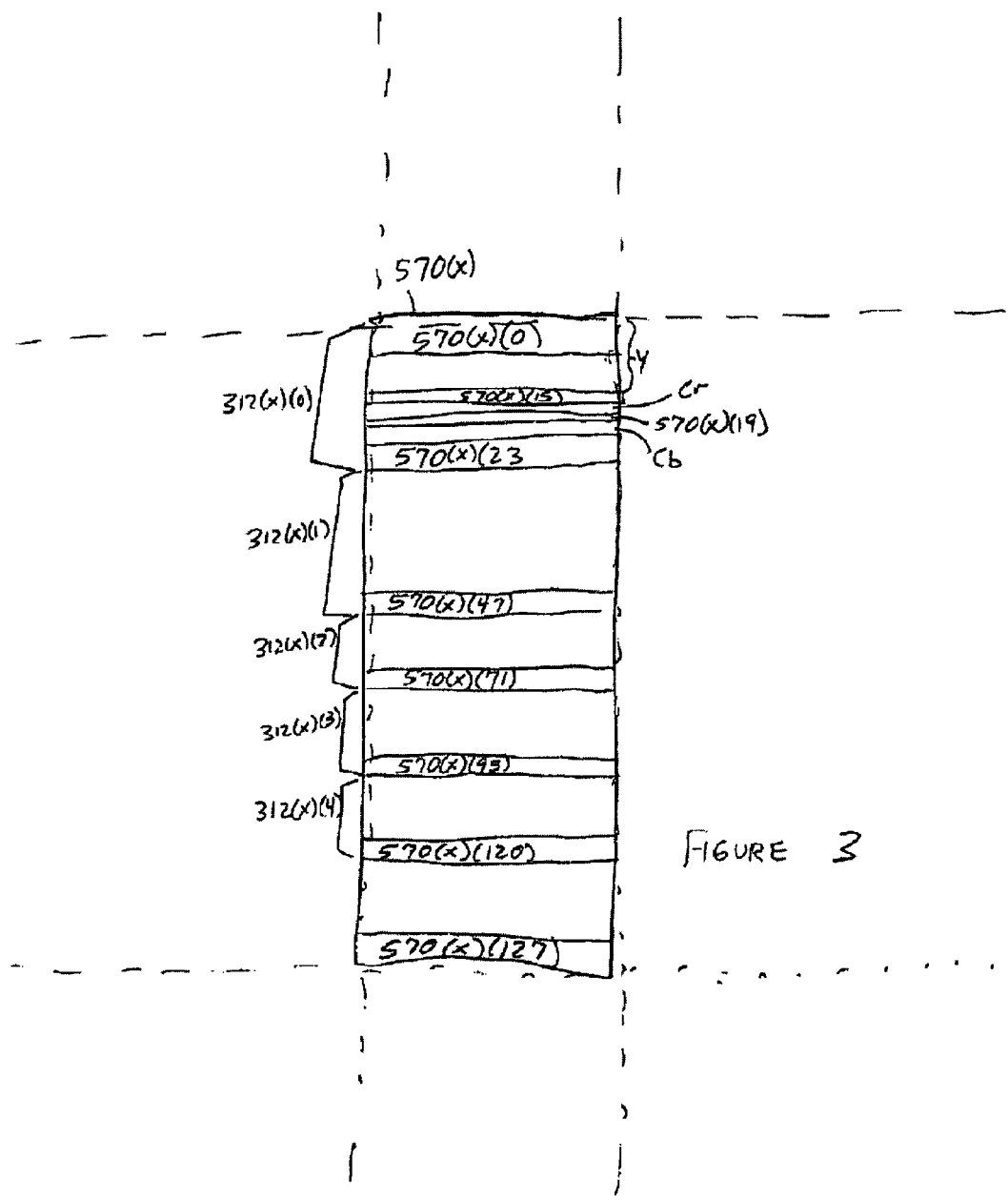
FIG. 3 is a block diagram of a frame buffer storing macroblocks in accordance with an embodiment of the present invention.

Referring now to FIG. 3, there is illustrated a block diagram of the frame buffer 570 storing macroblocks 312(0) . . . 312(n) in accordance with another embodiment of the present invention. The frame buffer 570 comprises a plurality of sections 570(0) . . . 570(n). Each section 570(x) comprises 128 consecutive data words 570(x)(0) . . . 570(x)(127). The data words 570(x)(0) . . . 570(x)(127) further comprise 16 bytes for storage of data. Accordingly, each section 570(0) . . . 570(n) comprises 2048 bytes of memory.

Each section 570(0) . . . 570(n) stores a corresponding set of five macroblocks 312(x)(0) . . . 312(x)(4) therein. As noted above, a macroblock 312 comprises a 16 byte×16 byte luminance matrix Y (or four 8 byte×8 byte luminance blocks), and two 8 byte×8 byte chrominance matrices or blocks, Cr, Cb.

In each section 570(x), the luminance matrix Y of the first macroblock 312(x)(0) occupies data words 570(x)(0) . . . 570(x)(15), the chrominance matrices Cr and Cb of the first macroblock 312(x)(0) occupy the data words 570(x)(16) . . . 570(x)(23). The chrominance matrix Cr can occupy the first eight bytes of the data words 570(x)(16) . . . 570(x)(23), while the chrominance matrix Cb can occupy the last eight bytes of the data words 570(x)(16) . . . 570(x)(23).

The second macroblock 312(x)(1) occupies the data words 570(x)(24) . . . 570(x)(47). The luminance matrix Y of the second macroblock 312(x)(1) occupies data words 570(x)

(24) . . . 570(x)(39). The chrominance matrix Cr can occupy the first eight bytes of the data words 570(x)(40) . . . 570(x)(47), while the chrominance matrix Cb can occupy the last eight bytes of the data words 570(x)(40) . . . 570(x)(47).

The third macroblock 312(x)(2), fourth macroblock 312(x)(3), and fifth macroblock 312(x)(4) are stored in data words 570(48) . . . 570(71), data words 570(72) . . . 570(95), and data words 570(96) . . . 570(119), respectively, in a similar manner as described above. The data words 570(120) . . . 570(127) are unoccupied. The portions of the macroblocks 312(x)(0) . . . 312(x)(4) and the data words 570(x)(0) . . . 570(x)(127) where the macroblocks 312(x)(0) . . . 312(x)(4) are stored are indicated in the following table.

| | |
|---|---|
| First Macroblock 312(x)(0) | 570(0) . . . 570(23) |
| Luminance Matrix Y | 570(0) . . . 570(15) |
| Chrominance Matrix Cr, Cb | 570(16) . . . 570(23) |
| Second Macroblock 312(x)(1) | 570(24) . . . 570(47) |
| Luminance Matrix Y | 570(24) . . . 570(39) |
| Chrominance Matrix Cr, Cb | 570(40) . . . 570(47) |
| Third Macroblock 312(x)(2) | 570(48) . . . 570(71) |
| Luminance Matrix Y | 570(48) . . . 570(63) |
| Chrominance Matrix Cr, Cb | 570(64) . . . 570(71) |
| Fourth Macroblock 312(x)(3) | 570(72) . . . 570(95) |
| Luminance Matrix Y | 570(72) . . . 570(87) |
| Chrominance Matrix Cr, Cb | 570(88) . . . 570(95) |
| Fifth Macroblock 312(x)(2) | 570(96) . . . 570(119) |
| Luminance Matrix Y | 570(96) . . . 570(111) |
| Chrominance Matrix Cr, Cb | 570(112) . . . 570(119) |

Storage of marcoblocks 312 in the foregoing manner is advantageous because the macroblocks 312 occupy continuous memory locations, e.g., 24 consecutive data words. The decoder 545 can overwrite a single or up to five macroblocks 312 with new macroblocks 312 from another picture 115, with a single write transaction of the new macroblock 312 to section 570(x).

Another advantage is that the data word address where each set of five macroblocks 312 begins is offset from the data word address of another set of macroblocks 312 by factor of a power of two, e.g., 128 or 10000000 in binary. Additionally, a frame with a 720 pixel width includes macroblock rows of 45 macroblocks 312. Furthermore, a high portion of the memory locations in the frame buffer 570 are used, e.g., 120 data words/128 data words, or 93.75% utilization.

Figure 4:
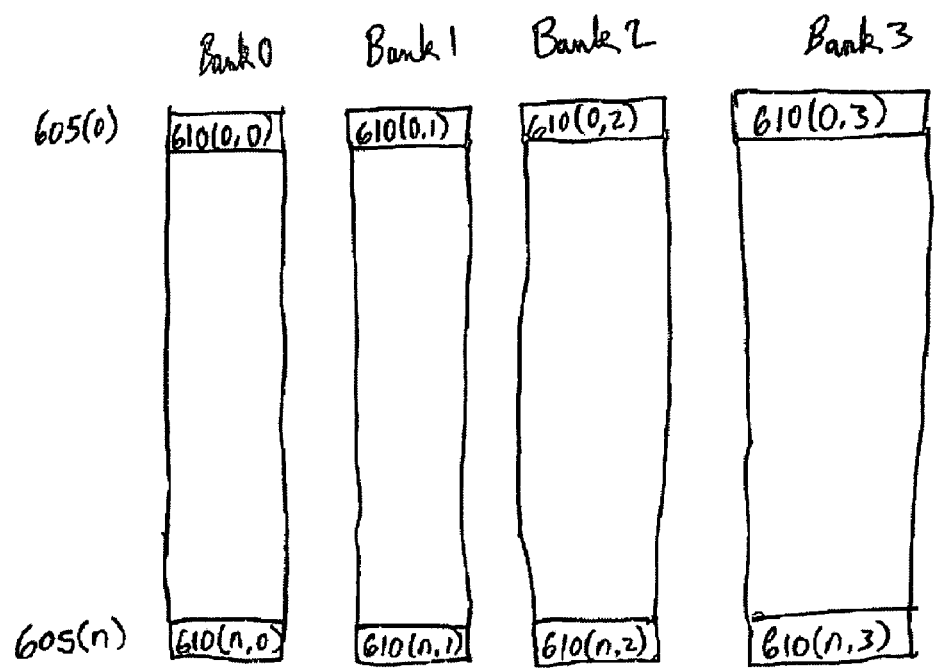
FIG. 4 is a block diagram of a frame buffer storing macroblocks in accordance with another embodiment of the present invention.
Figure 4:
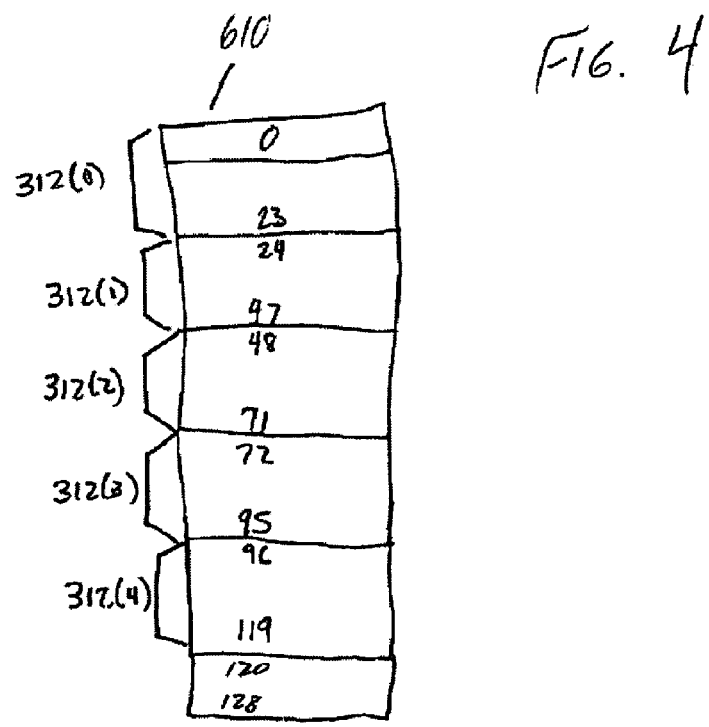

Referring now to FIG. 4, there is illustrated a block diagram of the frame buffer 570 storing macroblocks in accordance with another embodiment of the present invention. The frame buffer 570 is a DDR-SDRAM memory and comprises any number of DDR rows 605(0) . . . 605(n), and four banks. Of course, although in the present embodiment, there are four banks, it is noted that alternative embodiment of the present invention may include any number of banks. Each row 605 straddles each of the banks.

Each row 605 comprises at least 512 Gigantic data words, wherein each gigantic data word comprises 16 bytes. Accordingly, the portion of a row 605 that straddles a particular bank, now referred to as a row bank 610(0,0), 610(0,1), 610(0,2), 610(0,3), . . . , 610(n,0), 610(n,1), 610(n,2), 610(n,3) comprises at least 128 data words.

Each row bank 610 stores a corresponding set of five macroblocks 312(0) . . . 312(4. As noted above, a macroblock 312 comprises a 16×16 luminance matrix Y, and two 8×8 chrominance matrices or blocks, Cr, and Cb. The first set of five macroblocks 312(0) . . . 312(4) are stored in the first 120 data words, data words 0 . . . 119, of the row bank 610.

The portions of the macroblocks 312 and the data words in the row bank 610 where the macroblocks 312 are stored are indicated in the following table.

| 1st Set Macroblocks 312(0) . . . 312(4) | Data Words 0 . . . 119 |
|---|---|
| First Macroblock 312(0) | 0 . . . 23 |
| Luminance Matrix | 0 . . . 15 |
| Chrominance Matrix Cr, Cb | 16 . . . 23 |
| Second Macroblock 312(1) | 24 . . . 47 |
| Luminance Matrix | 24 . . . 39 |
| Chrominance Matrix Cr, Cb | 40 . . . 47 |
| Third Macroblock 312(2) | 48 . . . 71 |
| Luminance Matrix | 48 . . . 63 |
| Chrominance Matrix Cr, Cb | 64 . . . 71 |
| Fourth Macroblock 312(3) | 72 . . . 95 |
| Luminance Matrix | 72 . . . 87 |
| Chrominance Matrix Cr, Cb | 88 . . . 95 |
| Fifth Macroblock 312(4) | 96 . . . 119 |
| Luminance Matrix | 96 . . . 111 |
| Chrominance Matrix Cr, Cb | 112 . . . 119 |

Each set of macroblocks 312(0) . . . 312(4) can comprise any five macroblocks 312. However, in a particular embodiment, each macroblock set 312(0) . . . 312(4) can comprise five horizontally adjacent macroblocks 312. Additionally, in some cases, it advantageous to prevent vertically neighboring macroblocks 312 from occupying the same row bank 610. Accordingly, the row banks 610 can be populated by sets of macroblocks 312(0) . . . 312(4), pursuant to an algorithm that prevents vertically adjacent macroblocks 312 from occupying the same row bank 610. For example, such an algorithm may first store a section (five horizontally adjacent macroblocks 312(0) . . . 312(4)) or 2 power n sections, in each of the row banks 610 associated with a particular row 605, before storing another section (five horizontally adjacent macroblocks 312(5) . . . 312(9)) or 2 power n sections in the row bank 610.

The decoder system as described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein certain operations are implemented as instructions in firmware.

while the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for storing macroblocks in a memory, said method comprising:
   decoding a macroblock, thereby resulting in a decoded macroblock, said decoded macroblock comprising pixels; and
   executing an instruction, wherein the instruction causes:
   writing the decoded macroblock to the memory, wherein writing the macroblock to the memory further comprises:
      continuously writing a block of decoded luminance pixels to a first portion of the memory;
      continuously writing a first block of decoded chrominance pixels to a second portion of the memory;
      continuously writing a second block of decoded chrominance pixels to a third portion of the memory; and
      the first portion storing the block of decoded luminance pixels, second portion storing the first block of decoded chrominance pixels, and third portion storing the second block of decoded chrominance pixels, being contiguous and wherein each block comprises at least 8×8 pixels in a frame; and
   outputting the frame comprising said decoded macroblock to a display device.

2. A method for storing macroblocks in a memory, said method comprising:
   decoding five macroblocks, thereby resulting in decoded macroblocks, said decoded macroblocks comprising pixels; and
   executing at least one instruction, wherein the at least one instruction causes:
   writing the five macroblocks to the memory, wherein writing the macroblock to the memory further comprises:
      continuously writing five matrices of decoded luminance pixels to the memory;
      continuously writing a first five matrices of decoded chrominance pixels to the memory;
      continuously writing a second five matrices of decoded chrominance pixels to the memory; and
      the five matrices of decoded luminance pixels, the first five matrices of decoded chrominance pixels and the second five matrices of decoded chrominance pixels being stored contiguously in the memory, wherein the matrices of decoded luma pixels are at least 16×16 and wherein the matrices of decoded chrominance pixels are at least 8×8 in a frame; and
   outputting the frame comprising said five decoded macroblocks to a display device.

3. A circuit for storing macroblocks, said circuit comprising:
   a decoder for decoding macroblocks; and
   a computer readable medium storing an executable instruction, wherein the instruction causes:
   writing the macroblock to the memory, wherein writing the macroblock to the memory further comprises:
      continuously writing a matrix of decoded luminance pixels to a first portion of the memory;
      continuously writing a first matrix of decoded chrominance pixels to second portion of the memory;
      continuously writing a second matrix of decoded chrominance pixels to a third portion of the memory;
      wherein the matrix of decoded luminance pixels at least 16×16 in a frame, and wherein the first matrix and second matrix of decoded chrominance pixels are at least 8×8; and
      the first portion, second portion, and third portion being contiguous.

4. A circuit for storing macroblocks, said circuit comprising:
   a decoder for decoding five macroblocks, thereby resulting in decoded macroblocks, said decoded macroblocks comprising pixels; and
   a computer readable medium storing an executable instruction, wherein the instruction causes:
   writing the five macroblocks to the memory, wherein writing the macroblock to the memory further comprises:
      continuously writing five matrices of decoded luminance pixels to a first portion of the memory;
      continuously writing a first five matrices of decoded chrominance pixels to a second portion of the memory;
      continuously writing a second five matrices of decoded chrominance pixels to a third portion of the memory, wherein the matrices of decoded luma pixels are at least 16×16 and wherein the matrices of decoded chrominance pixels are at least 8×8 in a frame; and
      the first portion, second portion, and third portion being contiguous.

5. The method of claim 1, wherein one portion of a single data word is part of the second portion of the memory where the first matrix of chrominance pixels are written and another portion of the single data word is part of the third portion of the memory where the second matrix of chrominance pixels are written.

6. A method for storing macroblocks in a memory, said method comprising:
   decoding a macroblock, thereby resulting in a decoded macroblock, said decoded macroblock comprising pixels; and
   executing an instruction, wherein the instruction causes:
   writing the decoded macroblock to the memory, wherein writing the macroblock to the memory further comprises:
      writing a matrix of decoded luminance pixels to a first portion of the memory;
      writing a first matrix of decoded chrominance pixels to a second portion of the memory;
      writing a second matrix of decoded chrominance pixels to a third portion of the memory; and
      the first portion, second portion, and third portion being contiguous; and
   outputting a frame comprising said decoded macroblock to a display device; and
   wherein the frame comprises a plurality of sequential macroblocks, and wherein periodic ones of the sequential macroblocks are stored at memory addresses that are offset by a power of 2.

7. A method for storing macroblocks in a memory, said method comprising:
   decoding five macroblocks, thereby resulting in decoded macroblocks, said decoded macroblocks comprising pixels; and
   executing an instruction, wherein the instruction causes:
   writing the five macroblocks to the memory, wherein writing the macroblock to the memory further comprises:
      writing five matrices of decoded luminance pixels to the memory;
      writing a first five matrices of decoded chrominance pixels to the memory;
      writing a second five matrices of decoded chrominance pixels to the memory; and
      the five matrices of decoded luminance pixels, the first five matrices of decoded chrominance pixels and the second five matrices of decoded chrominance pixels being stored contiguously in the memory;
outputting a frame comprising said five decoded macroblocks to a display device;
decoding another five macroblocks, thereby resulting in decoded another macroblocks, said decoded another macroblocks comprising pixels; and
executing an instruction, wherein the instruction causes:
writing the another five macroblocks to the memory, wherein writing the another five macroblocks to the memory further comprises:
 writing another five matrices of decoded luminance pixels to the memory;
 writing a another first five matrices of decoded chrominance pixels to the memory;
 writing a another second five matrices of decoded chrominance pixels to the memory; and
wherein the another five matrices of decoded luminance pixels, another first five matrices of decoded chrominance pixels to the memory, and the another second five matrics of decoded chrominance pixels are written contiguously to the memory; and
wherein each one of the first five matrices of luminance pixels, the first five matrices of decoded chrominance pixels, and the second five matrices of decoded chrominance pixels are stored at memory addresses that are offset by a power of two from memory addresses storing each one of the another first five matrices of luminance pixels, the another first five matrices of decoded chrominance pixels, and the another second five matrices of decoded chrominance pixels.

* * * * *